US006636788B2

(12) United States Patent
Tamagawa et al.

(10) Patent No.: US 6,636,788 B2
(45) Date of Patent: Oct. 21, 2003

(54) CONTROL APPARATUS FOR ELECTRIC MOTOR AND CONTROL APPARATUS FOR HYBRID VEHICLE

(75) Inventors: Yutaka Tamagawa, Wako (JP); Takuya Shirasaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/114,474

(22) Filed: Apr. 3, 2002

(65) Prior Publication Data

US 2002/0147530 A1 Oct. 10, 2002

(30) Foreign Application Priority Data

Apr. 4, 2001 (JP) .......................... 2001-105689
Jan. 11, 2002 (JP) .......................... 2002-004523

(51) Int. Cl.[7] .............................. B60L 11/00; B60L 9/00
(52) U.S. Cl. .................. 701/22; 701/105; 180/65.1; 180/65.2
(58) Field of Search .................. 701/22, 99, 101, 701/105; 180/65.1, 65.2, 65.8; 318/34, 558

(56) References Cited

U.S. PATENT DOCUMENTS 4,896,101 A * 1/1990 Cobb ........................ 324/73.1
5,592,059 A * 1/1997 Archer ...................... 318/254
6,140,786 A * 10/2000 Lee .......................... 318/471

FOREIGN PATENT DOCUMENTS

JP 11-027806 1/1999
JP 2000-032602 1/2000

* cited by examiner

Primary Examiner—William A. Cuchlinski, Jr.
Assistant Examiner—Olga Hernandez
(74) Attorney, Agent, or Firm—Arent Fox Kintner Plotkin & Kahn, PLLC

(57) ABSTRACT

A corrected torque command value P_TRQ which is produced by correcting a torque command value TRQ with a torque command correcting unit 34 is substantially proportional to the armature current of an electric motor. Using the corrected torque command value P_TRQ and its average value P_ATRQ, an inferred temperature change Δtf of the electric motor is determined in each predetermined cycle time. The inferred temperature change Δtf calculated in a fuzzy inference operation, for example. The inferred temperature change Δtf is integrated by an integrating unit 37 to determine an accumulated temperature change ΔTf. The output of the electric motor is limited when the accumulated temperature change ΔTf exceeds a predetermined value.

17 Claims, 9 Drawing Sheets

FIG. 6

| RULE No. | ANTECEDENT PART | | CONSEQUENT PART | |
| --- | --- | --- | --- | --- |
| | P_TRQ | P_ATRQ | TEMPERATURE CHANGE | (VALUE OF TEMPERATURE CHANGE) |
| 1 | SMALL | SMALL | DROP | $Y = A1$ |
| 2 | SMALL | LARGE | SMALL ON INCREASE | $Y = A2$ |
| 3 | MEDIUM | SMALL | SMALL ON INCREASE | $Y = A3$ |
| 4 | MEDIUM | LARGE | MEDIUM ON INCREASE | $Y = A4$ |
| 5 | LARGE | SMALL | MEDIUM ON INCREASE | $Y = A5$ |
| 6 | LARGE | LARGE | LARGE ON INCREASE | $Y = A6$ |

CONTROL APPARATUS FOR ELECTRIC MOTOR AND CONTROL APPARATUS FOR HYBRID VEHICLE

BACKGROUND OF THE INVENTION

1. Field of the Invention

The present invention relates to an apparatus for controlling an electric motor and an apparatus for controlling a hybrid vehicle.

2. Description of the Related Art

Electric vehicles and hybrid vehicles which incorporate electric motors for generating propulsive forces for the vehicles operate selectively in power and regenerative modes for the electric motors depending on the operating state (the accelerator pedal operation, the vehicle speed, etc.) of the vehicles. Generally, a torque command value (a command value of the power torque or regenerative torque) for the electric motor is generated depending on the operating state of the vehicle, and an output torque of the electric motor is controlled depending on the generated torque command value. Various control processes including a so-called d-q vector control process are known in the art for controlling the output torque of the electric motor depending on the torque command value.

Electric motors mounted on electric vehicles and hybrid vehicles are required to produce a wide range of output torques in view of their application, and are often needed to produce an output torque in excess of the rated torque at which the electric motors are capable of continuous operation without fail. Therefore, the electric motors are frequently operated while generating a relatively large amount of heat with a large current passing therethrough, and hence are required to prevent themselves from being overheated. According to a known solution, as disclosed in Japanese laid-open patent publications Nos. 11-27806 and 2000-32602, the temperature of an electric motor is detected by a temperature sensor, and when the detected temperature exceeds a predetermined temperature, the output torque of the electric motor is forcibly limited.

However, the conventional arrangement which uses the temperature sensor to detect the temperature of an electric motor is highly costly because it requires the temperature sensor itself and parts by which the temperature sensor is installed on the electric motor. Furthermore, a plurality of temperature sensors need to be actually used for continued operation in the event of a temperature sensor failure. As a result, the cost of the entire system is higher, and it is hard to keep an installation space for the temperature sensors.

SUMMARY OF THE INVENTION

It is therefore an object of the present invention to provide an apparatus for controlling an electric motor to prevent the electric motor from being overheated with an inexpensive simple means without the need for temperature sensors.

Another object of the present invention to provide an apparatus for controlling a hybrid vehicle to prevent an electric motor in the hybrid vehicle from being overheated with an inexpensive simple means.

The inventors have found that while an electric motor is operating with a normal output torque, e.g., an output torque smaller than a rated torque, the temperature of the electric motor generally does not become excessively high, and the steady temperature of the electric motor during such an operating state is substantially constant. For preventing the electric motor from being overheated, it is considered sufficient to be able to recognize temperature changes of the electric motor basically in a situation where the output torque of the electric motor is relatively large.

A temperature change of the electric motor within a sufficiently short period of time (an instantaneous temperature change), or particularly a temperature change upon a temperature increase from the steady temperature of the electric motor, can be inferred using data of a torque command value for the electric motor and data of an average of torque command values. Since a current flowing through the armature of the electric motor is basically proportional to the torque command value, the torque command value is closely related to the amount of heat (Joule heat) generated by the electric motor which is mainly responsible for the temperature increase of the electric motor. The average of torque command values is closely related to the tendency of the temperature change of the electric motor (the tendency for the temperature change of the electric motor to increase or decrease). Therefore, it is possible to appropriately infer the temperature change of the electric motor using the data of the torque command value and the data of the average of torque command values.

To achieve the above objects, there is provided in accordance with the present invention an apparatus for controlling an electric motor depending on a torque command value, comprising inference means for sequentially calculating an inferred value of a temperature change of the electric motor in each cycle time using at least data representing the torque command value and data representing an average of torque command values, integrating means for sequentially integrating the inferred value of the temperature change of the electric motor to calculate an accumulated temperature change, and output limiting means for limiting the output of the electric motor when the accumulated temperature change exceeds a predetermined output limiting threshold.

According to the present invention, there is also provided an apparatus for controlling a hybrid vehicle having an engine for generating a propulsive force for the hybrid vehicle, an electric motor coupled to an output shaft of the engine for selectively generating an assistive propulsive force for the hybrid vehicle in a power mode and generating electric energy using the kinetic energy of the hybrid vehicle as an energy source in a regenerative mode, depending on the operating state of the hybrid vehicle, and an electric energy storage device as a power supply for the electric motor in the power mode, the arrangement being such that a torque command value for the electric motor is generated depending on the operating state of the hybrid vehicle, and the electric motor is controlled depending on the torque command value, the apparatus having the inference means, the integrating means, and the output limiting means described above in the apparatus for controlling the electric motor.

With the apparatus for controlling the electric motor and the apparatus for controlling the hybrid vehicle according to the present invention, using at least the data representing the torque command value and the data representing the average of torque command values, it is possible to appropriately infer a temperature change of the electric motor in each cycle time. By integrating the inferred value of the temperature change with the integrating means, an accumulated temperature change from an arbitrary temperature of the electric motor can sequentially be recognized. When the accumulated temperature change exceeds the output limiting threshold, the output of the electric motor is limited by the output limiting means thereby to prevent the electric motor from being overheated. The accumulated temperature change can be determined by a processing operation of a microcomputer or the like without the need for sensors such as temperature sensors.

According to the present invention, therefore, the electric motor is prevented from being overheated with an inexpensive arrangement without the need for sensors such as temperature sensors.

With the apparatus for controlling the electric motor and the apparatus for controlling the hybrid vehicle according to the present invention, various algorithms may be employed to determine the inferred value of the temperature change. For example, the inference means may comprise fuzzy inference means for sequentially calculating an inferred value of a temperature change of the electric motor according to a fuzzy inference operation using at least the data representing the torque command value and the data representing an average of torque command values as input parameters.

According to the inventors' finding, when the data representing the torque command value and the data representing the average of torque command values as input parameters of the fuzzy inference operation, it is possible to appropriately infer, with relatively high accuracy, a temperature change of the electric motor according to the fuzzy inference operation by suitably establishing a fuzzy inference algorithm (specifically membership functions and fuzzy rules). Consequently, it is possible to appropriately prevent the electric motor from being overheated.

With the inference means comprising the fuzzy inference means, membership functions and fuzzy rules used in the fuzzy inference operation are established such that the inferred value of the temperature change is substantially zero when the torque command value is present in a predetermined range.

With the above arrangement, it is possible to keep the accumulated temperature change at a value close to "0" in a steady temperature of the electric motor when the electric motor is operated by controlling the output torque of the electric motor at a normal torque. The accumulated temperature change determined when the output torque of the electric motor is relatively large represents a temperature change from the steady temperature of the electric motor. As a consequence, the output of the electric motor can be limited at a suitable time depending on the accumulated temperature change.

The fuzzy inference means preferably comprises means for using a first membership function for classifying and expressing the degree of the magnitude of the torque command value, a second membership function for classifying and expressing the degree of the magnitude of the average of torque command values, and a plurality of fuzzy rules having the input parameters in an antecedent part thereof and a plurality of preset values for the temperature change in a consequent part thereof, determining the fitnesses of the input parameters with respect to the antecedent part of the fuzzy rules based on the first and second membership functions, and determining the center of gravity of the temperature change in the consequent part as the inferred value of the temperature change using the determined fitnesses as weighting coefficients.

The fuzzy inference means can thus calculate the inferred value of the temperature change according to a relatively simple process.

Since the torque command value is closely related to the amount of heat (Joule heat) generated by the electric motor and the average of torque command values is closely related to the tendency of the temperature change of the electric motor, the first membership function is preferably established to represent a model of the amount of heat generated by the electric motor with respect to the torque command value, and the second membership function is preferably established to represent a model of the tendency of the temperature change of the electric motor with respect to the average of torque command values.

Specifically, because the amount of heat (Joule heat) generated by the electric motor is basically proportional to the square of the torque command value, the first membership function relative to the torque command value is preferably established to classify the magnitude of the torque command value into three degrees, i.e., "small", "medium", and "large", for example. For preventing the electric motor from being overheated, a temperature increase from the steady temperature of the electric motor poses a problem. Therefore, a range of torque command values for preventing the temperature of the electric motor from increasing from the steady temperature (e.g., a range of torque command values below the rated torque of the electric motor) is preferably classified as "small", and ranges of torque command values for allowing the temperature of the electric motor to increase from the steady temperature are preferably classified as "medium" and "large".

The second membership function relative to the average of torque command values is preferably representative of a state in which the temperature of the electric motor has a tendency to increase from the steady temperature and a state in which the temperature of the electric motor has a tendency to decrease from the steady temperature. The second membership function is preferably established to classify the magnitude of the average of torque command values into two degrees, i.e., "small" and "large", for example. Therefore, a range of averages of torque command values for allowing the temperature of the electric motor to increase from the steady temperature (e.g., a range of torque command values above the rated torque of the electric motor) is preferably classified as "large", and a range of averages of torque command values for allowing the temperature of the electric motor to decrease from the steady temperature (e.g., a range of torque command values sufficiently smaller than the rated torque of the electric motor) is preferably classified as "small".

If the apparatus has an electric energy storage device as a power supply for the electric motor, the apparatus should preferably further comprise consequent part correcting means for correcting at least one of the preset values for the temperature change in the consequent part of the fuzzy rules depending on the temperature of the electric energy storage device.

With the above arrangement, it is possible to adjust, depending on the temperature of the electric energy storage device, the magnitude of the inferred value of the temperature change calculated by the fuzzy inference means and hence the value of the accumulated temperature change calculated by the integrating means. Consequently, the output of the electric motor can be limited in view of the temperature of the electric energy storage device as the power supply for the electric motor.

Specifically, the consequent part correcting means preferably comprises means for correcting at least one of the preset values for the temperature change in order to reduce the inferred value of the temperature change as the temperature of the electric energy storage device is lower, and to increase the inferred value of the temperature change as the temperature of the electric energy storage device is higher.

By thus correcting at least one of the preset values for the temperature change in the consequent part of the fuzzy rules of the fuzzy inference means depending on the temperature of the electric energy storage device, when the temperature of the electric energy storage device is relatively low, even if the torque command value is relatively large, the rate at which the accumulated temperature change increases is reduced, the output of the electric motor is limited later than when the temperature of the electric energy storage device is normal. The period in which a relatively large current flows through the electric energy storage device is increased, making it possible to warm up the electric energy storage device quickly and preventing the electric energy storage device from suffering a reduction in its electric energy supplying capability in a low temperature environment such as during winder. When the temperature of the electric energy storage device is low, the temperature of the electric motor is also relatively low. Therefore, even if the output of the electric motor is limited later than when the temperature of the electric energy storage device is normal, no problem arises in preventing the electric motor from being overheated.

Conversely, when the temperature of the electric energy storage device is relatively high, the rate at which the accumulated temperature change increases is increased if the torque command value is relatively large, and hence the output of the electric motor is limited earlier than when the temperature of the electric energy storage device is normal. Consequently, the electric motor is reliably prevented from being overheated, and the temperature of the electric energy storage device is simultaneously prevented from being excessively increased.

Therefore, the electric energy storage device can be kept at a desired temperature, and can maintain its desired charging and discharging performance.

The output limiting means preferably comprises means for limiting the output torque of the electric motor to a torque which is equal to or lower than a predetermined torque which is preset to lower the temperature of the electric motor. This arrangement is effective in reliably preventing the electric motor from being overheated.

The output limiting means preferably comprises means for canceling the limitation of the output of the electric motor when the accumulated temperature change exceeds the output limiting threshold and thereafter becomes lower than a predetermined limitation canceling threshold which is smaller than the output limiting threshold.

With the above arrangement, when the accumulated temperature change exceeds the output limiting threshold and the output limiting means starts limiting the output of the electric motor, the output of the electric motor is continuously limited until the accumulated temperature change becomes lower than the limitation canceling threshold which is lower than the output limiting threshold. Thus, the limitation of the output of the electric motor has hysteresis characteristics with respect to the accumulated temperature change. As a consequence, the process of limiting the output of the electric motor and the process of canceling the limitation of the output of the electric motor are prevented from being frequently carried at short time intervals, preventing the output torque of the electric motor from fluctuating frequently.

A so-called d-q vector control process is generally known for controlling an electric motor such as a DC brushless motor. In the d-q vector control process, a d-q coordinate system is assumed which has a d-axis representing the direction of a magnetic field of the electric motor and a q-axis representing the direction perpendicular to the direction of the magnetic field, and the armature circuit of the electric motor is represented by an equivalent circuit comprising a hypothetical armature in the d-axis direction and a hypothetical armature in the q-axis direction. An armature current component id in the d-axis direction and an armature current component iq in the q-axis direction are determined depending on the torque command value, and the armature current (phase current) of the electric motor is vector-controlled based on the determined armature current components id, iq. If the direction of the magnetic field of the electric motor is the d-axis direction, then the armature current component id has a function as an exciting current and the armature current component iq has a function as a current for determining the output torque of the electric motor.

In the d-q vector control process, a field weakening control process is performed in a range of high rotational speeds of the electric motor. In the field weakening control process, the armature current (phase current) of the electric motor is relatively large even if the output torque of the electric motor is relatively small. More specifically, in the field weakening control process, the armature current (phase current) of the electric motor is represented by $\sqrt{(id^2+iq^2)}$. Therefore, the torque command value ($\propto iq$) is not proportional to the armature current of the electric motor in the field weakening control process. The field weakening control process is not carried out in the d-q vector control process in a range of low rotational speeds of the electric motor. When id≈0, the armature current of the electric motor is approximately equal to the armature current component iq in the q-axis direction, and the torque command value is proportional to the armature current of the electric motor.

If the apparatus has means for performing a d-q vector control process of the electric motor, as means for controlling the electric motor depending on the torque command value, then the apparatus comprises torque command correcting means for correcting the torque command value depending on at least a rotational speed of the electric motor, and the fuzzy inference means is supplied with a corrected value of the torque command value produced by the torque command correcting means and an average of corrected values produced by the torque command correcting means, as the input parameters, rather than the torque command value and the average of torque command values.

More specifically, the torque command correcting means comprises means for correcting the torque command value so as to be increased as the rotational speed of the electric motor is higher.

With the above arrangement, when the rotational speed of the electric motor is high and the field weakening control process is performed, the corrected value representing the torque command value corrected so as to be increased and an average of corrected values are supplied as input parameters to the fuzzy inference means. Therefore, input parameters having a magnitude based on the actual armature current of the electric motor are supplied to the fuzzy inference means. As a result, even when the field weakening control process is being carried out, the inferred value of a temperature increase of the electric motor per cycle time can appropriately be calculated, and hence the accumulated temperature change can appropriately be obtained. Accordingly, the electric motor is appropriately prevented from being overheated.

In the d-q vector control process, the relationship between the torque command value and the actual armature current of the electric motor is slightly affected by the power supply voltage (the voltage of the electric energy storage device) of the electric motor. Therefore, the torque command value may be corrected by the torque command correcting means depending on not only the rotational speed of the electric motor, but also the power supply voltage of the electric motor. Since the actual armature current of the electric motor with respect to the torque command value is greater as the power supply voltage of the electric motor is higher, the torque command value should preferably be corrected so as to be increased as the power supply voltage is lower.

The various details described above of the apparatus for controlling the electric motor according to the present invention may be applied to the apparatus for controlling the hybrid vehicle according to the present invention. Particularly, if the fuzzy inference means comprises means for using a first membership function for classifying and expressing the degree of the magnitude of the torque command value, a second membership function for classifying and expressing the degree of the magnitude of the average of torque command values, and a plurality of fuzzy rules having the input parameters in an antecedent part thereof and a plurality of preset values for the temperature change in a consequent part thereof, determining the fitnesses of the input parameters with respect to the antecedent part of the fuzzy rules based on the first and second membership functions, and determining the center of gravity of the temperature change in the consequent part as the inferred value of the temperature change using the determined fitnesses as weighting coefficients, then the apparatus preferably further comprises consequent part correcting means for correcting at least one of the preset values for the temperature change in the consequent part of the fuzzy rules depending on the engine temperature of the engine.

With the above arrangement, it is possible to adjust, depending on the engine temperature of the engine, the magnitude of the inferred value of the temperature change which is calculated by the fuzzy inference means based on the torque command value and its average value, and hence the value of the accumulated temperature change calculated by the integrating means. Thus, the output of the electric motor can be limited in view of the temperature of the engine.

Specifically, the consequent part correcting means preferably comprises means for correcting at least one of the preset values for the temperature change in order to reduce the inferred value of the temperature change by a smaller value when at least the engine temperature of the engine is lower than a predetermined temperature than when the engine temperature is higher than the predetermined temperature.

By thus correcting at least one of the preset values for the temperature change in the consequent part of the fuzzy rules of the fuzzy inference means depending on the engine temperature of the engine, when the engine temperature is low and hence the engine is cold, even if the torque command value is relatively large, the rate at which the accumulated temperature change increases is reduced, and the output of the electric motor is limited later than when the temperature of the electric energy storage device is normal. Therefore, it is possible to appropriately maintain a drive power required by the vehicle while suppressing the load on the engine at a low temperature, making it possible for the vehicle to exhibit a good running performance. When the engine temperature is low, the temperature of the electric motor is also relatively low. However, since there is a more chance for a relatively large current to flow through the electric motor, the electric motor can be warmed up early. Because when the engine temperature is low, the temperature of the electric motor is also relatively low, no problem arises in preventing the electric motor from being overheated even if the output of the electric motor is limited later than when the engine temperature is normal.

If the apparatus has engine loss reduction control means for performing a process of reducing a pumping loss of the engine when the electric motor operates in the regenerative mode, then the apparatus preferably comprises engine loss reduction inhibiting means for inhibiting the process of reducing a pumping loss of the engine from being performed by the engine loss reduction control means when the accumulated temperature change exceeds a predetermined engine loss reduction inhibiting threshold which is lower than the output limiting threshold.

If the accumulated temperature change increases in the regenerative mode of the electric motor and the output of the electric motor is to be limited, then the process of reducing a pumping loss of the engine is inhibited before the output of the electric motor starts to be limited. Therefore, when the output of the electric motor starts to be limited, so-called engine braking is applied to the hybrid vehicle. As a result, even if the braking power of the vehicle produced by the regenerative mode of the electric motor is abruptly reduced by the limitation of the output of the electric motor, engine braking is applied in a manner to compensate for the reduction of the braking power, resulting in a desired amount of braking power for braking the vehicle.

The process of reducing a pumping loss of the engine is performed by stopping the supply of the fuel to at least one cylinder of the engine and closing the intake and exhaust valves of the cylinder, or opening a valve mounted on an exhaust gas recirculation path which connects the exhaust passage to intake passage of the engine, or delaying the closing or opening of the intake and exhaust valves of the cylinder.

If the process of reducing a pumping loss of the engine is to be inhibited, then the engine loss reduction inhibiting means preferably comprises means for permitting the process of reducing a pumping loss of the engine to be performed by the engine loss reduction control means when the accumulated temperature change exceeds the engine loss reduction inhibiting threshold and thereafter becomes lower than a predetermined engine loss reduction permitting threshold which is lower than the engine loss reduction inhibiting threshold.

With above arrangement, when the accumulated temperature change exceeds the engine loss reduction inhibiting threshold, and the process of reducing a pumping loss of the engine to be performed by the engine loss reduction control means is inhibited, the inhibition continues until the accumulated temperature change becomes lower than the engine loss reduction permitting threshold which is lower than the engine loss reduction inhibiting threshold. Therefore, the processes of inhibiting and permitting the reduction of a pumping loss of the engine are carried out with hysteresis characteristics with respect to the accumulated temperature change. As a result, the inhibition or permission of the reduction of a pumping loss of the engine is prevented from being frequently carried out at short time intervals, allowing the vehicle to run smoothly.

The above and other objects, features, and advantages of the present invention will become apparent from the fol-

BRIEF DESCRIPTION OF THE DRAWINGS

FIG. 6 is a diagram showing fuzzy rules used in the processing operation of the motor controller shown in FIG. 2;

DESCRIPTION OF THE PREFERRED EMBODIMENTS

A first embodiment of the present invention will be described below with reference to FIGS. 1 through 11.

Figure 1:
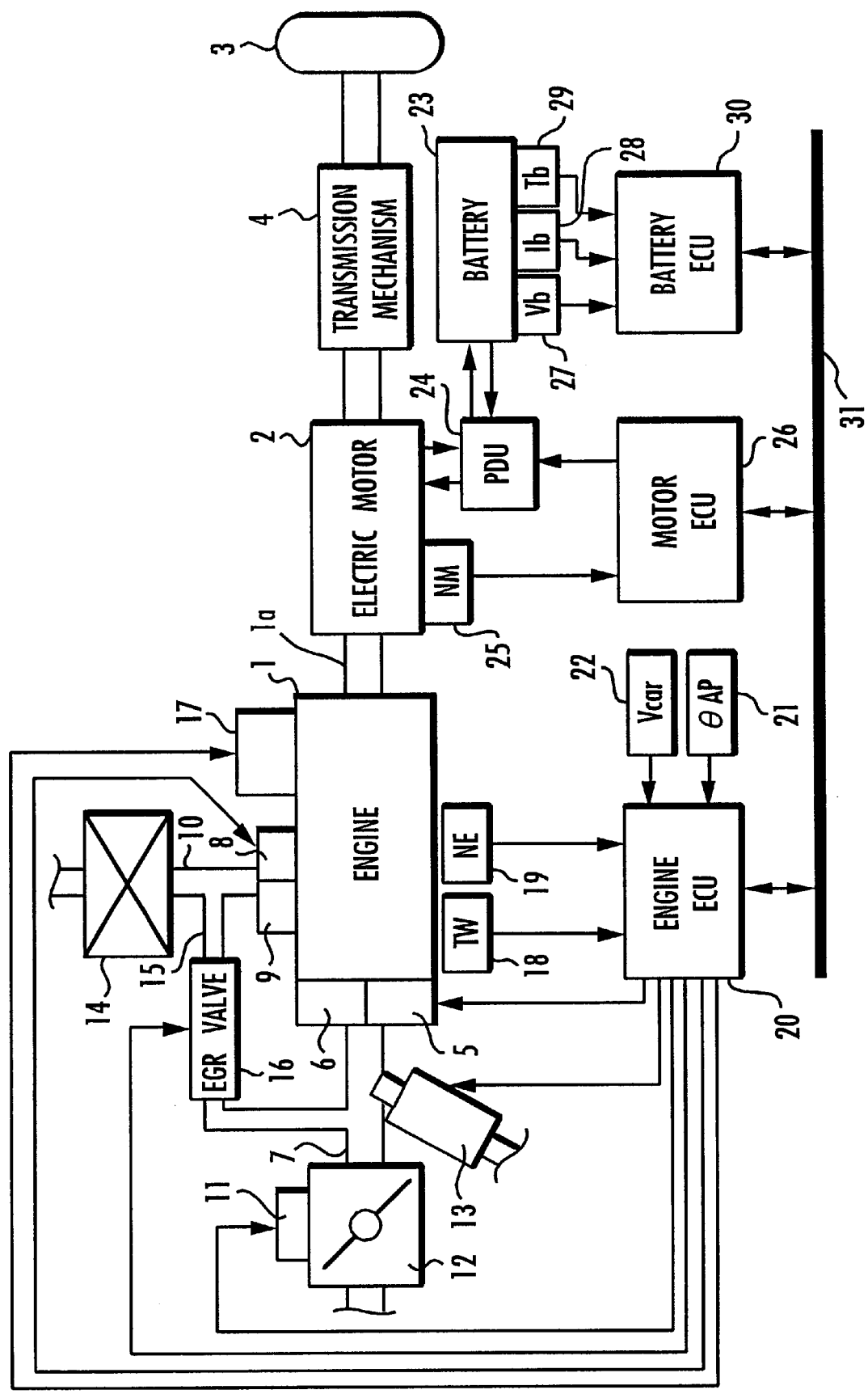
FIG. 1 is a block diagram of an overall system of a hybrid vehicle according to a first embodiment of the present invention.

FIG. 1 shows in block form an overall system of a hybrid vehicle according to the first embodiment of the present invention. As shown in FIG. 1, the system includes an engine 1, an electric motor 2, and a drive wheel 3 of the hybrid vehicle. The electric motor 2 has a rotor (not shown) coupled to an output shaft 1a of the engine 1 for rotation in unison therewith. The output shaft 1a of the engine 1 and the rotor of the electric motor 2 are connected to the drive wheel 3 by a transmission mechanism 4, which transmits rotational drive power between the output shaft 1a of the engine 1 and the rotor of the electric motor 2, and the drive wheel 3.

The rotor of the electric motor 2 may be connected to the output shaft 1a of the engine 1 by a suitable rotation transmitting mechanism using pulleys, a belt, etc.

The engine 1 comprises an internal combustion engine having a plurality of cylinders (not shown) which are connected to an intake pipe 7 through intake valves 6 actuatable by an intake valve actuator 5 and also connected to an exhaust pipe 10 through exhaust valves 9 actuatable by an exhaust valve actuator 8. A throttle valve 12 actuatable by a throttle actuator 11 and a fuel injector 13 are mounted on the intake pipe 7 in respective positions that are spaced downstream along the intake pipe 7 toward the engine 1. A catalytic converter 14 for purifying exhaust gases emitted from the engine 1 is mounted on the exhaust pipe 10. An exhaust gas recirculation path 15 extends from the exhaust pipe 10 and is joined to the intake pipe 7 downstream of the throttle valve 12. The exhaust gas recirculation path 15 can be selectively opened and closed and its opening can be adjusted by a solenoid-operated valve 16 (hereinafter referred to as "EGR valve 16") mounted on the exhaust gas recirculation path 15. Igniters 17 are mounted on the engine 1 for igniting an air-fuel mixture in the cylinders of the engine 1.

The operating state of the engine 1 is detected by sensors including a temperature sensor 18 for detecting the engine temperature TW of the engine 1 (specifically, the temperature of the coolant of the engine 1) and a rotational speed sensor 19 for detecting the rotational speed NE of the engine 1. The system further includes an engine controller 20 (hereinafter referred to as "engine ECU 20") in the form of an electronic circuit including a CPU, etc. for controlling operation of the engine 1. The engine ECU 20 is supplied with detected data from the temperature sensor 18 and the rotational speed sensor 19, and detected data from an accelerator sensor 21 for detecting an accelerator operation quantity θAP and a vehicle speed sensor 22 for detecting a vehicle speed Vcar. The engine ECU 20 controls the intake valve actuator 5, the exhaust valve actuator 8, the throttle actuator 11, the fuel injector 13, the EGR valve 16, and the igniters 17 based on the supplied data according to a predetermined program, thereby controlling the operation of the engine 1.

In the present embodiment, the engine ECU 20, the intake valve actuator 5, and the exhaust valve actuator 8 jointly make up an engine loss reduction means according to the present invention.

The electric motor 2 is connected to a battery 23 (electric energy storage device) as a power supply through a power drive circuit 24 (hereinafter referred to as "PDU 24"), and can supply electric power (regenerated power when the electric motor 2 is in a regenerative mode) to and receive electric power (supplied power when the electric motor 2 is in a power mode) from the battery 23 through the PDU 24. In the present embodiment, the electric motor 2 comprises a three-phase DC brushless motor, for example.

A rotational speed sensor 25 for detecting the rotational speed NM of the electric motor 2 is associated with the electric motor 2 in order to detect the operating state of the electric motor 2. Operation of the electric motor 2 is controlled by a motor controller 26 (hereinafter referred to as "motor ECU 26") in the form of an electronic circuit including a CPU, etc. The motor ECU 26 is supplied with detected data from the rotational speed sensor 25. The motor ECU 26 controls the electric motor 2 through the PDU 24 based on the supplied data according to a predetermined program.

The battery 23 is associated with a voltage sensor 27 for detecting a voltage Vb (hereinafter referred to as "battery voltage Vb") across the battery 23, a current sensor 28 for detecting a current Ib (hereinafter referred to as "battery current Ib") of the battery 23, and a temperature sensor 29 for detecting a temperature Tb (hereinafter referred to as "battery temperature Tb") of the battery 23. The state of the battery 23 is monitored by a battery controller 30 (hereinafter referred to as "battery ECU 30") in the form of an electronic circuit including a CPU, etc. The battery ECU 30 is supplied with detected data from the voltage sensor 27, the current sensor 28, and the temperature sensor 29. The battery ECU 30 performs a process of recognizing the remaining capacity of the battery 23 based on the supplied data according to a predetermined program.

The engine ECU 20, the motor ECU 26, and the battery ECU 30 are connected to each other by a bus line 31, and can exchange the detected data from the various sensors and data generated in their control processes with each other.

In the illustrated embodiment, the battery 23 (secondary cells) is used as the electric energy storage device as a power supply for the electric motor 2. However, a large-capacitance capacitor such as an electric double-layer capacitor may be used as the electric energy storage device.

Figure 2:
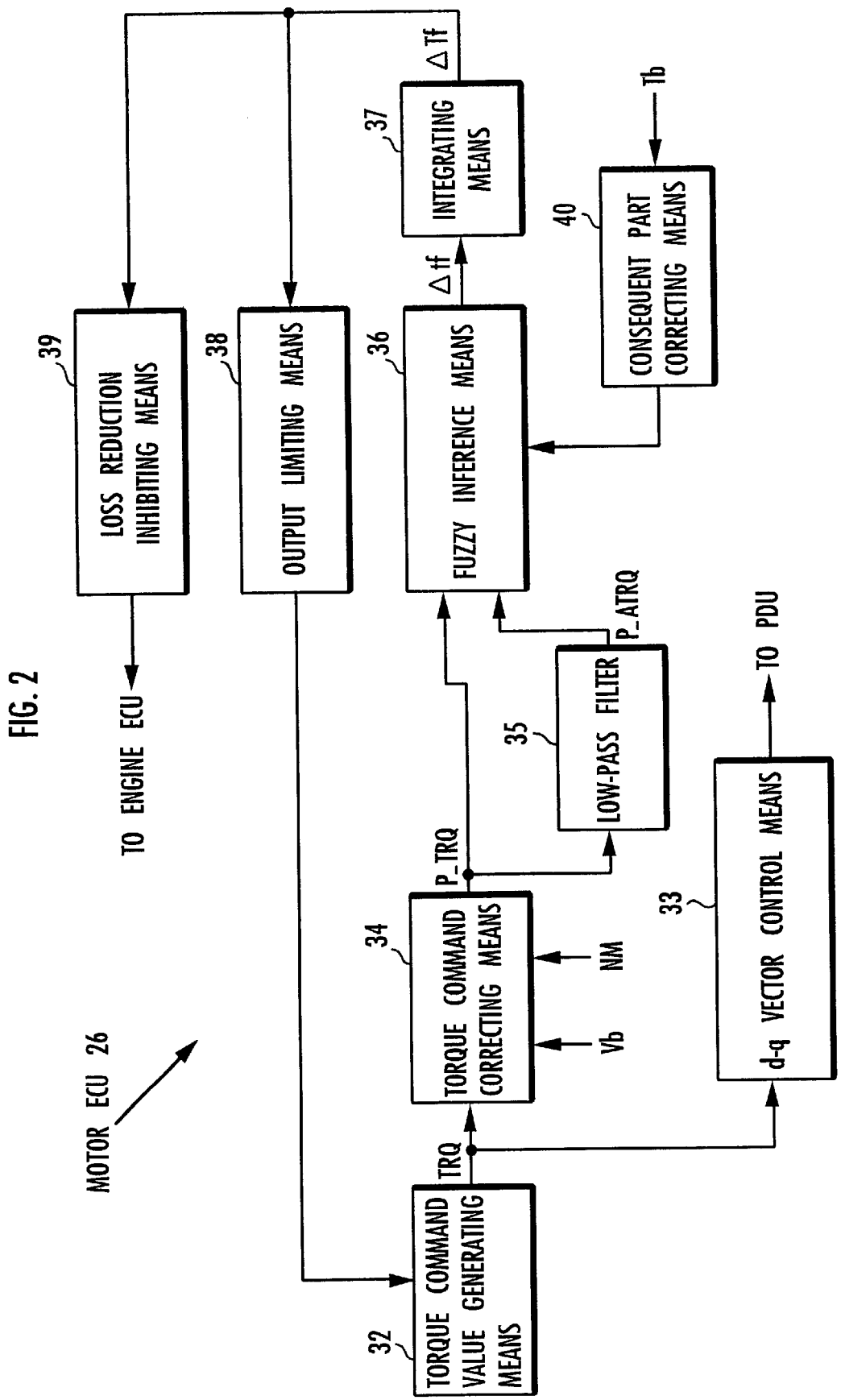
FIG. 2 is a block diagram showing the functions of a motor controller in the system shown in FIG. 1.

The motor ECU 26 which has a particular bearing on the present invention will be described below with reference to FIG. 2.

The motor ECU 26 has, as its functional components, a torque command value generating means 32 for sequentially generating a torque command value TRQ for a torque to be generated by the rotor of the electric motor 2, a d-q vector control means 33 for effecting d-q control over an armature current of the electric motor 2 in order to enable the electric motor 2 to generate the torque according to the torque command value TRQ, a torque command correcting means 34 for correcting the torque command value TRQ depending on the battery voltage Vb and the rotational speed NM of the electric motor 2, a low-pass filter 35 for effecting low-pass filtering (e.g., moving average process) on a torque command value P_TRQ corrected by the torque command correcting means 34 (hereinafter referred to as "corrected torque command value P_TRQ") thereby to calculate an average value P_ATRQ of the corrected torque command value (hereafter referred to as "average corrected torque command value P_ATRQ"), a fuzzy inference means 36 (inference means) for sequentially determining an inferred value Δtf of a temperature change of the electric motor 2 (hereinafter referred to as "inferred temperature change Δtf") per cycle time from the average corrected torque command value P_ATRQ and the corrected torque command value P_TRQ according to a fuzzy inference operation, and an integrating means 37 for sequentially integrating (accumulatively adding) the inferred temperature change Δtf to produce an accumulated temperature change ΔTf.

The motor ECU 26 also has an output limiting means 38 for limiting the output of the electric motor 2 depending on the accumulated temperature change ΔTf determined by the integrating means 37 and canceling the limitation of the output of the electric motor 2, and a loss reduction inhibiting means 39 for inhibiting a pumping loss reduction process for the engine 1 which is carried out by the engine ECU 20 and canceling the inhibition of the pumping loss reduction process. The motor ECU 26 further includes a consequent part correcting means 40 for correcting a set value in a consequent part, to be described later on, used in the processing operation of the fuzzy inference means 36, depending on the battery temperature Tb. The torque command value generating means 32 and the output limiting means 38 jointly make up an output limiting means according to the present invention.

The torque command value generating means 32 sequentially generates torque command values TRQ to be generated by the electric motor 2 depending on the operating state of the vehicle, as described in specific detail later on. The generated torque command values TRQ include a torque command value for the power mode of the electric motor 2 and a torque command value for the regenerative mode (power generating mode) of the electric motor 2. The torque command value for the power mode is a positive value, whereas the torque command value for the regenerative mode is a negative value.

The d-q vector control means 33 determines, depending on the torque command value TRQ, an armature current component id in the d-axis direction and an armature current component iq in the q-axis direction in a hypothetical equivalent circuit of the armature circuit of the electric motor 2 in a d-q coordinate system having a d-axis representing the direction of a magnetic field of the electric motor 2 and a q-axis representing the direction perpendicular to the direction of the magnetic field. The d-q vector control means 33 controls the armature current (phase current) of the electric motor 2 based on the determined armature current components id, iq through the PDU 24, thereby enabling the electric motor 2 to generate the torque according to the torque command value TRQ. The d-q vector control means 33 also performs a field weakening control process in a high speed range of the electric motor 2 to increase the armature current component id as an exciting current for thereby weaken the magnetic fluxes of the magnets (now shown) of the electric motor 2. The above basic d-q vector control process will not further be described below as it, including the field weakening control process, is known in the art.

The torque command correcting means 34 corrects the torque command value TRQ, more precisely its absolute value |TRQ|, in order to make up for the magnitude of the torque command value TRQ and the armature current (phase current) of the electric motor 2 to fail to be proportional to each other because of the field weakening control process of the d-q vector control means 33. According to the d-q vector control process including the field weakening control process, when the torque command value TRQ is constant, or stated equivalently, when the armature current component iq in the q-axis direction, as the rotational speed of the electric motor 2 is higher, the armature current component id in the d-axis direction increases, making the armature current of the electric motor 2 greater. When the torque command value TRQ is constant, the armature current of the electric motor 2 is slightly affected by the battery voltage Vb as the power supply voltage for the electric motor 2, and as the battery voltage Vb is lower, the armature current (phase current) of the electric motor 2 becomes somewhat greater.

Figure 3:
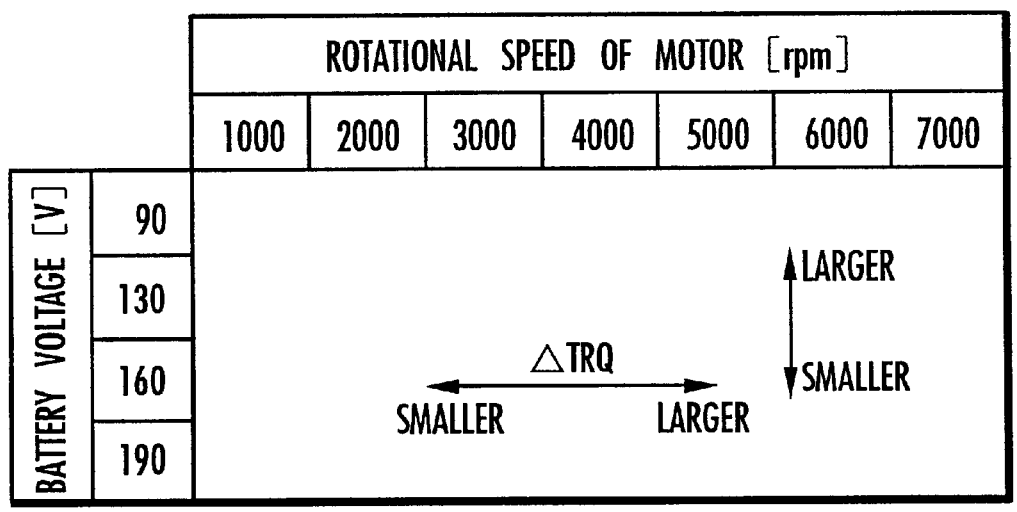
FIG. 3 is a diagram showing a map used in the processing operation of the motor controller shown in FIG. 2.

In the present embodiment, the torque command correcting means 34 determines a corrective quantity ΔTRQ for the torque command value TRQ from the rotational speed NM of the electric motor 2 and the battery voltage Vb using a map shown in FIG. 3. The torque command correcting means 34 adds the determined corrective quantity ΔTRQ to the absolute value |TRQ| of the torque command value TRQ, thereby determining the corrected torque command value P_TRQ (=|TRQ|+ΔTRQ). In the map shown in FIG. 3, the corrective quantity ΔTRQ is basically larger as the rotational speed NM of the electric motor 2 is higher and as the battery voltage Vb is lower. The corrected torque command value P_TRQ thus determined by correcting the torque command value TRQ with the corrective quantity ΔTRQ is substantially proportional to the armature current (=√(id$^2$+iq$^2$)) of the electric motor 2 according to the d-q vector control process.

If the rotational speed NM of the electric motor 2 is a low speed (i.e., a low speed to make id≈0) and the battery voltage Vb is relatively high (i.e., normal battery voltage Vb), then ΔTRQ≈0, and in this case P_TRQ≈|TRQ|.

The fuzzy inference means 36 stores, in a memory not shown, predetermined membership functions and a plurality of fuzzy rules in order to determine an inferred temperature change Δtf from the corrected torque command value P_TRQ and the average corrected torque command value P_ATRQ which serve as input parameters for the fuzzy inference means 36.

The membership functions include first membership functions for classifying and expressing the degree of the magnitude of the corrected torque command value P_TRQ and second membership functions for classifying and expressing the degree of the magnitude of the average corrected torque command value P_ATRQ.

Figure 4:
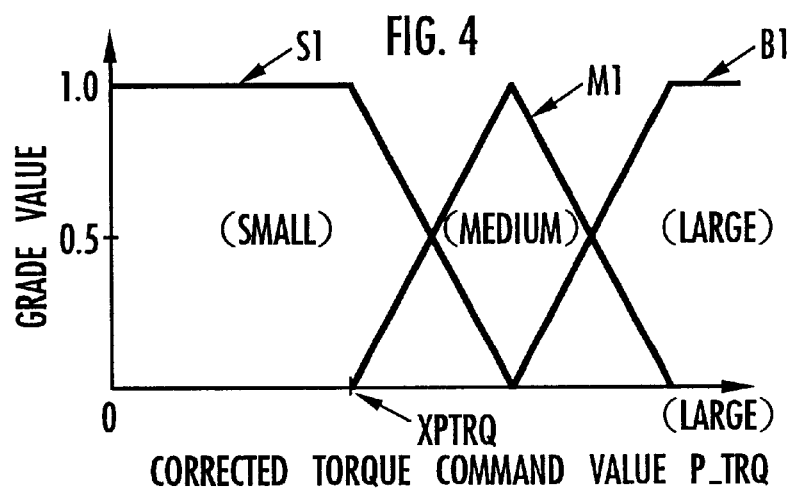
FIG. 4 is a diagram showing membership functions used in the processing operation of the motor controller shown in FIG. 2.

As shown in FIG. 4, the first membership functions include a trapezoidal membership function S1 corresponding to small magnitudes of the corrected torque command value P_TRQ, a triangular membership function M1 corresponding to medium magnitudes of the corrected torque command value P_TRQ, and a trapezoidal membership function B1 corresponding to large magnitudes of the corrected torque command value P_TRQ.

The first membership functions S1, M1, B1 represents a model of the amount of heat generated by the electric motor 2 (or more specifically, the amount of heat generated by the armature of the electric motor 2) with respect to the corrected torque command value P_TRQ. Specifically, since the amount of heat generated by the armature of the electric motor 2 is proportional to the square of the armature current, it is proportional to the square of the corrected torque command value P_TRQ determined as described above. For modeling the characteristics of the amount of heat generated by the armature of the electric motor 2 with membership functions, it is preferable to use the above three membership functions S1, M1, B1. When the electric motor 2 is operating to produce a normal output torque, i.e., an output torque within a rated level, the temperature of the electric motor 2 is generally saturated at a certain constant temperature, e.g., 120° C., and does not become excessively high. For preventing the electric motor 2 from being overheated, the heating of the armature of the electric motor 2 which tends to increase the temperature of the electric motor 2 in excess of the above constant temperature becomes problematic. The first membership functions S1, M1, B1 in the present embodiment models the amount of heat generated by the electric motor 2 at torques higher than the rated torque, i.e., the maximum output torque at which the electric motor 2 continuously operates without fail. The degree of the magnitude of the corrected torque command value P_TRQ equal to or lower than a corrected torque command value XPTRQ corresponding to the rated torque (hereinafter referred to as "rated-torque-equivalent corrected torque command value XPTRQ") is referred to as "small", and the membership function S1 is established such that the grade value of the smallest membership function S1 in the range P_TRQ≦XPTRQ is "1". When the corrected torque command value P_TRQ exceeds XPTRQ, the grade value of the membership function S1 becomes progressively smaller and the grade value of the medium membership function M1 becomes progressively greater as the magnitude of the corrected torque command value P_TRQ increases. When the corrected torque command value P_TRQ further increases until the grade value of the medium membership function M1 reaches "1", the grade value of the membership function S1 becomes "0". When the corrected torque command value P_TRQ further increases, the grade value of the medium membership function M1 decreases progressively from "1" to "0", and the graded value of the membership function B1 increases progressively from "0" to "1".

Figure 5:
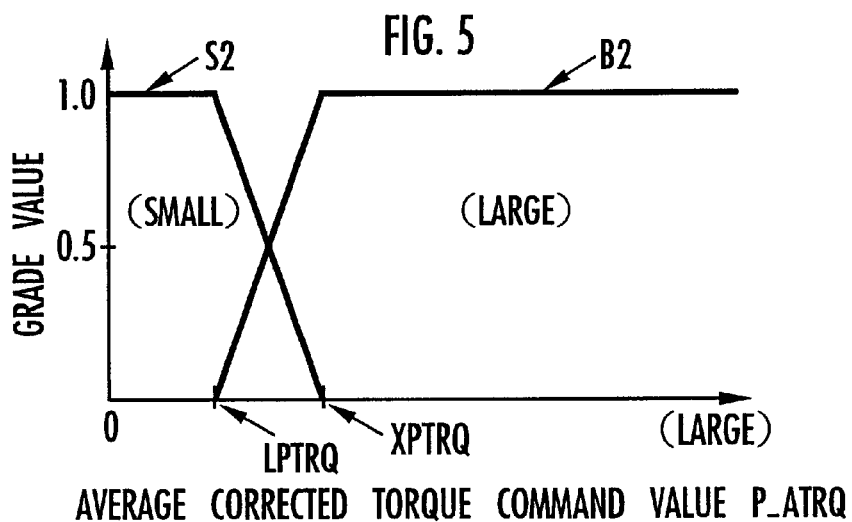
FIG. 5 is a diagram showing membership functions used in the processing operation of the motor controller shown in FIG. 2.

As shown in FIG. 5, the second membership functions include a trapezoidal membership function S2 corresponding to relatively small magnitudes of the average corrected torque command value P_ATRQ and a trapezoidal membership function B2 corresponding to relatively large magnitudes of the average corrected torque command value P_ATRQ.

The second membership functions S2, B2 represents a model of the tendency of temperature changes of the electric motor 2 with respect to the average corrected torque command value P_ATRQ, or specifically an increasing tendency of the temperature of the electric motor 2 or a decreasing tendency of the temperature of the electric motor 2. More specifically, when the average corrected torque command value P_ATRQ is relatively large, since the average armature current of the electric motor 2 is large, the temperature of the electric motor 2 has an increasing tendency. When the average corrected torque command value P_ATRQ is relatively small, since the average armature current of the electric motor 2 is small, the temperature of the electric motor 2 has a decreasing tendency. For modeling the tendency of temperature changes of the electric motor 2 with membership functions, it is preferable to use the above two membership functions S2, B2. When the average corrected torque command value P_ATRQ is greater than the rated-torque-equivalent corrected torque command value XPTRQ, the temperature of the electric motor 2 becomes higher than the above steady constant temperature of the electric motor 2. In the present embodiment, the degree of the magnitude of the average corrected torque command value P_ATRQ which is in the range of P_ATRQ>XPTRQ is referred to as "large", and the grade value of the second membership function B2 in the range of P_ATRQ>XPTRQ is "1". When the average corrected torque command value P_ATRQ is sufficiently small, e.g., the average corrected torque command value P_ATRQ is smaller than a given value LPTRQ (<XPTRQ) shown in FIG. 5, the temperature of the electric motor 2 becomes lower than the above steady constant temperature of the electric motor 2. In the present embodiment, the degree of the magnitude of the average corrected torque command value P_ATRQ which is in the range of P_ATRQ<LPTRQ is referred to as "small", and the grade value of the second membership function S2 in the range of P_ATRQ <XPTRQ is "1". When the average corrected torque command value P_ATRQ is in the range from the value LPTRQ to the value XPTRQ, the grade value of the membership function S2 decreases progressively from "1" to "0", and the graded value of the membership function B2 increases progressively from "0" to "1".

The fuzzy rules have the corrected torque command value P_TRQ and the average corrected torque command value P_ATRQ whose degrees of magnitudes are defined by the first membership functions S1, M1, B1 and the second membership functions S2, B2 in their antecedent part, and also have the degrees of the magnitudes of temperature changes of the electric motor 2 corresponding to the magnitudes of the corrected torque command value P_TRQ and the average corrected torque command value P_ATRQ in their consequent part. For example, the fuzzy inference means 36 employ six fuzzy rules as shown in FIG. 6.

In the present embodiment, the degrees of the magnitudes of temperature changes in the consequent part of the fuzzy rules represent the degrees of the magnitudes of temperature changes with respect to the steady constant temperature of the electric motor 2. In the present embodiment, in order to simplify the fuzzy inference operation, the degrees of the magnitudes of temperature changes in the consequent part of the fuzzy rules are represented by set values A1 through A6 for temperature changes preset with respect to the fuzzy rules (hereinafter referred to as "set temperature changes A1 through A6"), and the values Y in the consequent part of the fuzzy rules are represented by the set temperature changes A1 through A6. The set temperature change A1 corresponding to a drop in the temperature of the electric motor 2 (rule No. 1) is of a negative value, and the set temperature changes A2 through A6 corresponding to increases in the temperature of the electric motor 2 (rule Nos. 2 through 6) are of negative values. The set temperature changes A2 through A6 corresponding to increases in the temperature of the electric motor 2 have values increasing in the order of the rules "small", "medium", "large" in the consequent part. Specifically, the values of the set temperature changes A4, A5 are greater than the values of the set temperature changes A2, A3, and the value of the set temperature change A6 is greater than the values of the set temperature changes A4, A5.

The fuzzy inference means 36 uses the first membership functions S1, M1, B1, the second membership functions S2, B2, and the fuzzy rules thus established to determine sequentially per cycle time the inferred temperature change $\Delta tf$ from the corrected torque command value P_TRQ and the average corrected torque command value P_ATRQ according to the following fuzzy inference operation:

The fuzzy inference means 36 determines the fitnesses of the antecedent part of the fuzzy rules with respect to the corrected torque command value P_TRQ supplied from the torque command correcting means 34 and the average corrected torque command value P_ATRQ supplied from the low-pass filter 35, uses the determines fitnesses as weighting coefficients of the set temperature changes A1 through A6 in the consequent part of the fuzzy rules, and determines the center of gravity of the set temperature changes A1 through A6 as the inferred temperature change $\Delta tf$.

Specifically, if it is assumed that the fitnesses (grade values) of the first membership functions S1, M1, B1 with respect to the given corrected torque command value P_TRQ are represented by PT(S1), PT(M1), PT(B1) and the fitnesses (grade values) of the second membership functions S2, B2 with respect to the given average corrected torque command value P_ATRQ are represented by PA(S2), PA(B2), then the inferred temperature change $\Delta tf$ is determined according to the following equation (1):

$$\Delta tf = \{PT(S1) \cdot PA(S2) \cdot A1 + PT(S1) \cdot PA(B2) \cdot A2 + PT(M1) \cdot PA(S2) \cdot A3 + PT(M1) \cdot PA(B2) \cdot A4 + PT(B1) \cdot PA(S2) \cdot A5 + PT(B1) \cdot PA(B2) \cdot A6\} \div \{PT(S1) \cdot PA(S2) + PT(S1) \cdot PA(B2) + PT(M1) \cdot PA(S2) + PT(M1) \cdot PA(B2) + PT(B1) \cdot PA(S2) + PT(B1) \cdot PA(B2)\} \quad (1)$$

In the present embodiment, in a situation where the electric motor 2 is operating with an ordinary output torque, e.g., the corrected torque command value P_TRQ is equal to or smaller than rated-torque-equivalent corrected torque command value XPTRQ and varies in the range of LPTRQ $\leq$ P_TRQ $\leq$ XPTRQ, the membership functions S1, M1, B1, S2, B2 and the set temperature changes A1 through A6 in the consequent part of the fuzzy rules are set to maintain an accumulated temperature change $\Delta Tf$ which is produced when the inferred temperature change $\Delta tf$ is integrated by the integrating means 37, substantially at "0". This is to determine the accumulated temperature change $\Delta Tf$ with respect to the steady temperature of the electric motor 2.

In the present embodiment, the set temperature changes A1 through A6 in the consequent part of the fuzzy rules are corrected by the consequent part correcting means 40 as described later on. Specific details of the processing operation of the output limiting means 38 and the loss reduction inhibiting means 39 will also be described later on.

Figure 7:
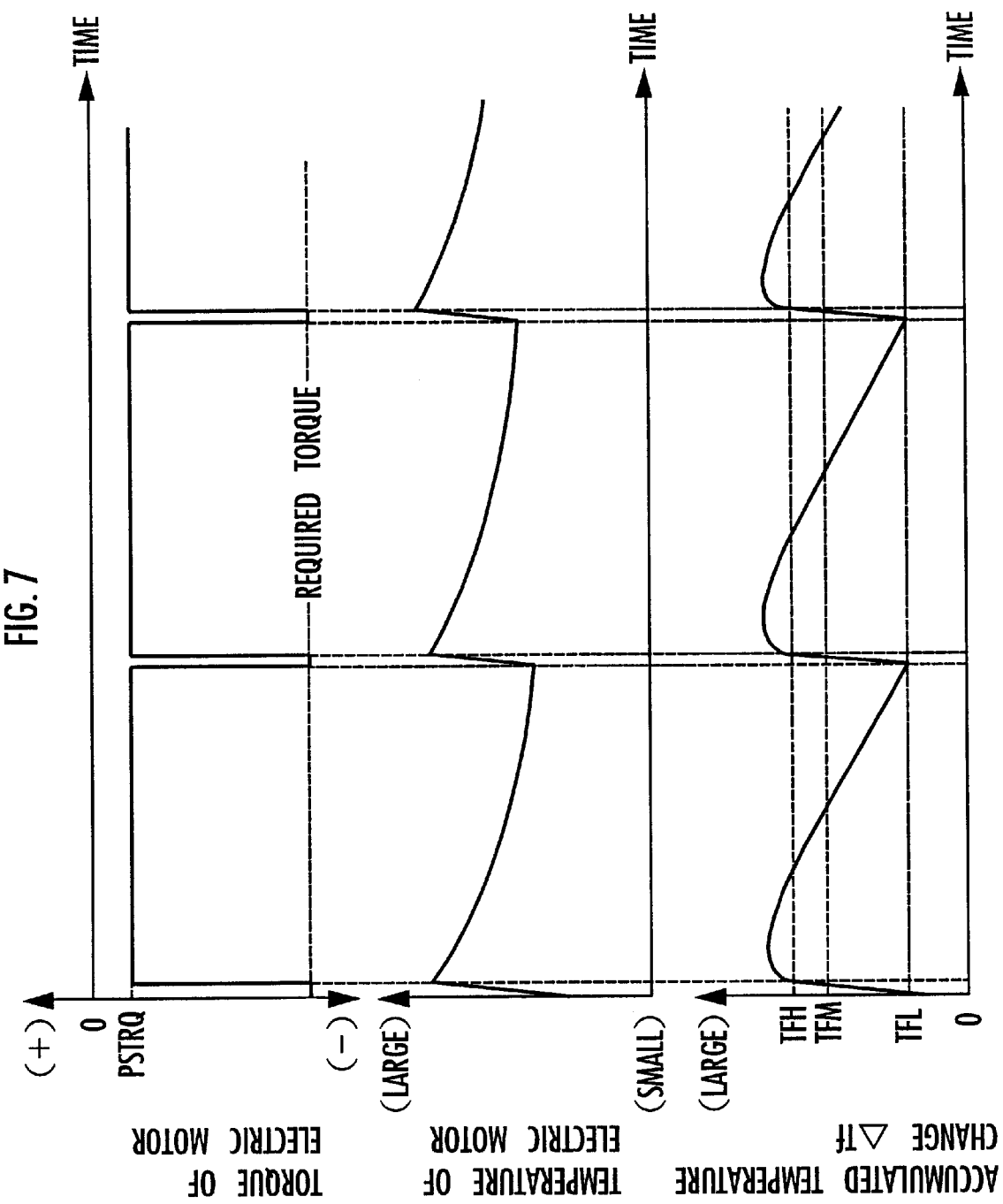
FIG. 7 is a diagram showing how the system operates according to the processing operation of the motor controller shown in FIG. 2.
Figure 8:
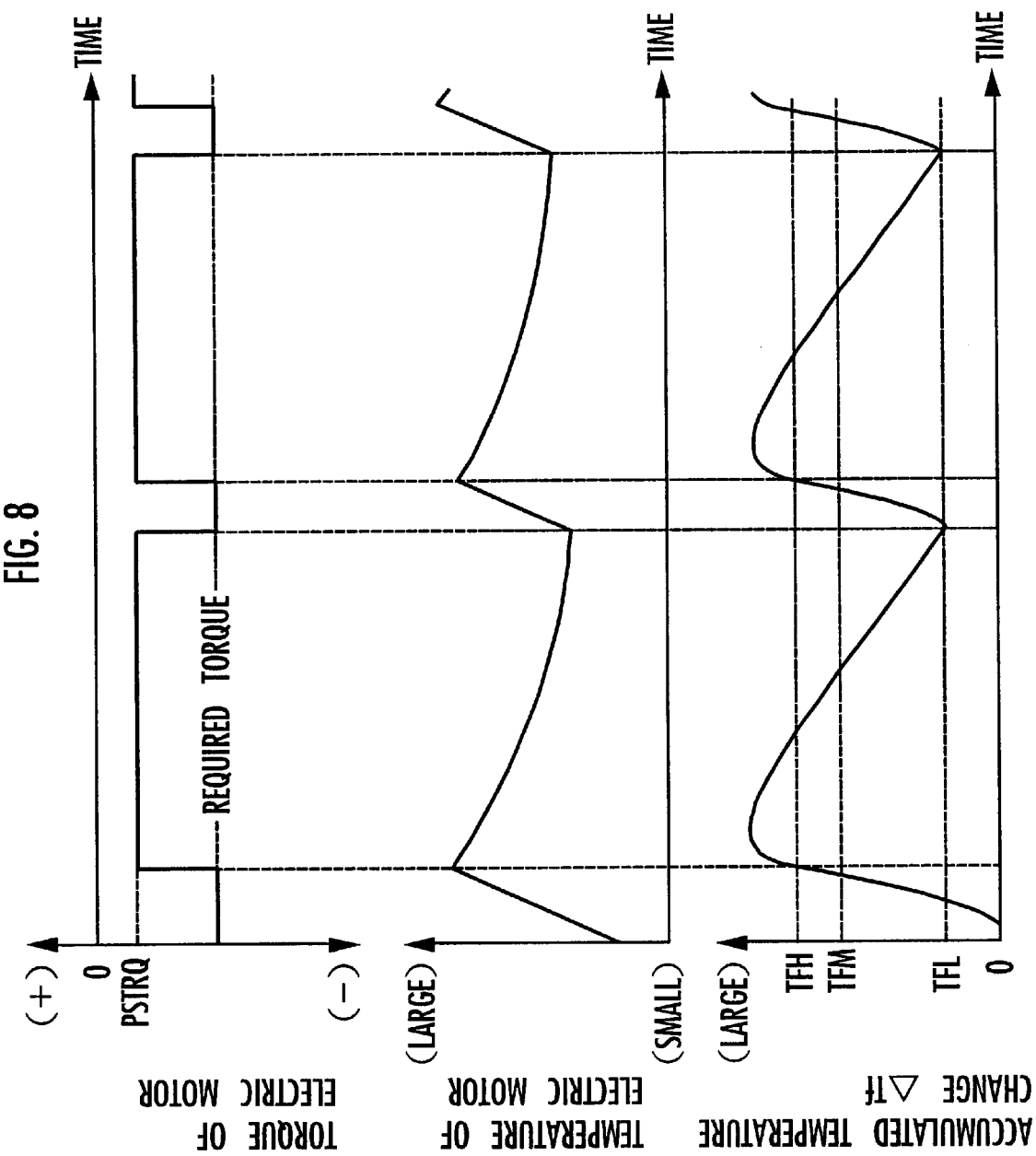
FIG. 8 is a diagram showing how the system operates according to the processing operation of the motor controller shown in FIG. 2.

The accumulated temperature change $\Delta Tf$ which is produced when the inferred temperature change $\Delta tf$ calculated by the fuzzy inference means 36 as described above is integrated by the integrating means 37 has a correlation to actual temperature changes of the electric motor 2 as shown in FIGS. 7 and 8.

FIGS. 7 and 8 show actual temperature changes of the electric motor 2 in their middle part and changes in the accumulated temperature change $\Delta Tf$ in their lower part at the time the torque (regenerative torque in this example) of the electric motor 2 changes as shown in their upper part. The maximum value of the absolute value of the regenerative torque of the electric motor 2 is greater in FIG. 7 than in FIG. 8.

As shown in FIGS. 7 and 8, when the temperature of the electric motor 2 increases as the torque increases, the accumulated temperature change $\Delta Tf$ increases in substantially the same pattern as the increase in the temperature of the electric motor 2, thus representing the actual temperature increase with relatively high accuracy. When the temperature of the electric motor 2 decreases as the torque decreases, any error or difference between the actual temperature decrease and the decrease in the accumulated temperature change $\Delta Tf$ is larger than when the temperature of the electric motor 2 increases. However, the error at the time the temperature of the electric motor 2 practically causes no trouble because the temperature increase of the electric motor 2 is significant in preventing the electric motor 2 from being overheated.

Operation of the hybrid vehicle will be described below.

First, operation of the hybrid vehicle will briefly be described below. In the present embodiment, in a situation where the accelerator pedal, not shown, of the vehicle is depressed when the vehicle is accelerated or under cruise control, a required propulsion output for the vehicle is determined depending on the accelerator operation quantity θAP and the vehicle speed Vcar. The proportions of the output of the engine 1 and the output of the electric motor 2 in the required propulsion output are determined depending on the remaining capacity of the battery 23 which is recognized by the ECU 30. Based on the determined proportions, the output of the engine 1 and the output of the electric motor 2 are controlled respectively by the engine ECU 20 and the motor ECU 26, and a drive power which is the sum of the drive powers of the engine 1 and the electric motor 2 is transmitted through the transmission mechanism 4 to the drive wheel 3 for thereby accelerating the vehicle or propelling the vehicle under cruise control. The proportion of the output of the electric motor 2 in the required propulsion output is greater as the remaining capacity of the battery 23 is greater.

At this time, the electric motor 2 chiefly operates in the power mode, and the torque command value TRQ sequentially generated by the torque command value generating means 32 of the motor ECU 26 is positive. Depending on the torque command value TRQ, the d-q vector control means 33 causes the PDU 24 to control the armature current of the electric motor 2, operating the electric motor 2 in the power mode to produce the output torque according to the torque command value TRQ. At this time, the torque command value TRQ is greater as the accelerator operation quantity θAP is greater. For example, if the accelerator operation quantity θAP is close to its maximum value, then the torque command value generating means 32 generates a torque command value TRQ in excess of the rated torque.

In a situation where the accelerator pedal is released to reduce accelerator operation quantity θAP, requiring the vehicle to decelerate, the kinetic energy of the vehicle transmitted from the drive wheel 3 through the transmission mechanism 4 to the electric motor 2 is used as an energy source to operate the electric motor 2 in the regenerative mode, and the electric energy generated by the electric motor 2 in the regenerative mode is supplied to charge the battery 23. At the time, the torque command value TRQ sequentially generated by the torque command value generating means 32 of the motor ECU 26 is negative, and the magnitude (absolute value) of the torque command value TRQ is greater as the vehicle speed Vcar is higher. If the accelerator pedal is released while the vehicle is running in a relatively high speed range or the vehicle is running on a downhill slope having a relatively large gradient while the accelerator pedal is being released, then the torque command value generating means 32 generates a torque command value TRQ having a magnitude in excess of the rated torque. The armature current of the electric motor 2 is controlled depending on the torque command value TRQ (<0) by the d-q vector control means 33 in the same manner as in the power mode.

When the vehicle is decelerated with the electric motor 2 operating in the regenerative mode, the engine ECU performs a process of reducing a pumping loss caused by a pumping action of the engine 1. In the process of reducing a pumping loss, the engine ECU 20 controls the fuel injector 13 to stop the supply of the fuel to the engine 1, and controls the intake valve actuator 5 and the exhaust valve actuator 9 to keep the intake valves 6 and the exhaust valves 9 of all the cylinders of the engine 1 closed. Since the pumping loss caused by the engine 1 upon deceleration of the vehicle is thus reduced, the portion of the kinetic energy of the vehicle which is consumed as a mechanical loss by the pumping loss of the engine 1 is reduced, allowing the kinetic energy of the vehicle to be transmitted efficiently to the electric motor 2. As a result, the efficiency of electric power generation in the regenerative mode of the electric motor 2 is increased to convert the kinetic energy of the vehicle efficiently into electric energy to charge the battery 23.

The pumping loss of the engine 1 may be reduced by closing some of the intake valves 6 and the exhaust valves 9 rather than closing the intake valves 6 and the exhaust valves 9 of all the cylinders of the engine 1. Alternatively, the EGR valve 16 on the exhaust gas recirculation path 15 may be opened, rather than closing the intake valves 6 and the exhaust valves 9 of all the cylinders of the engine 1, to reduce the pumping loss of the engine 1.

Figure 9:
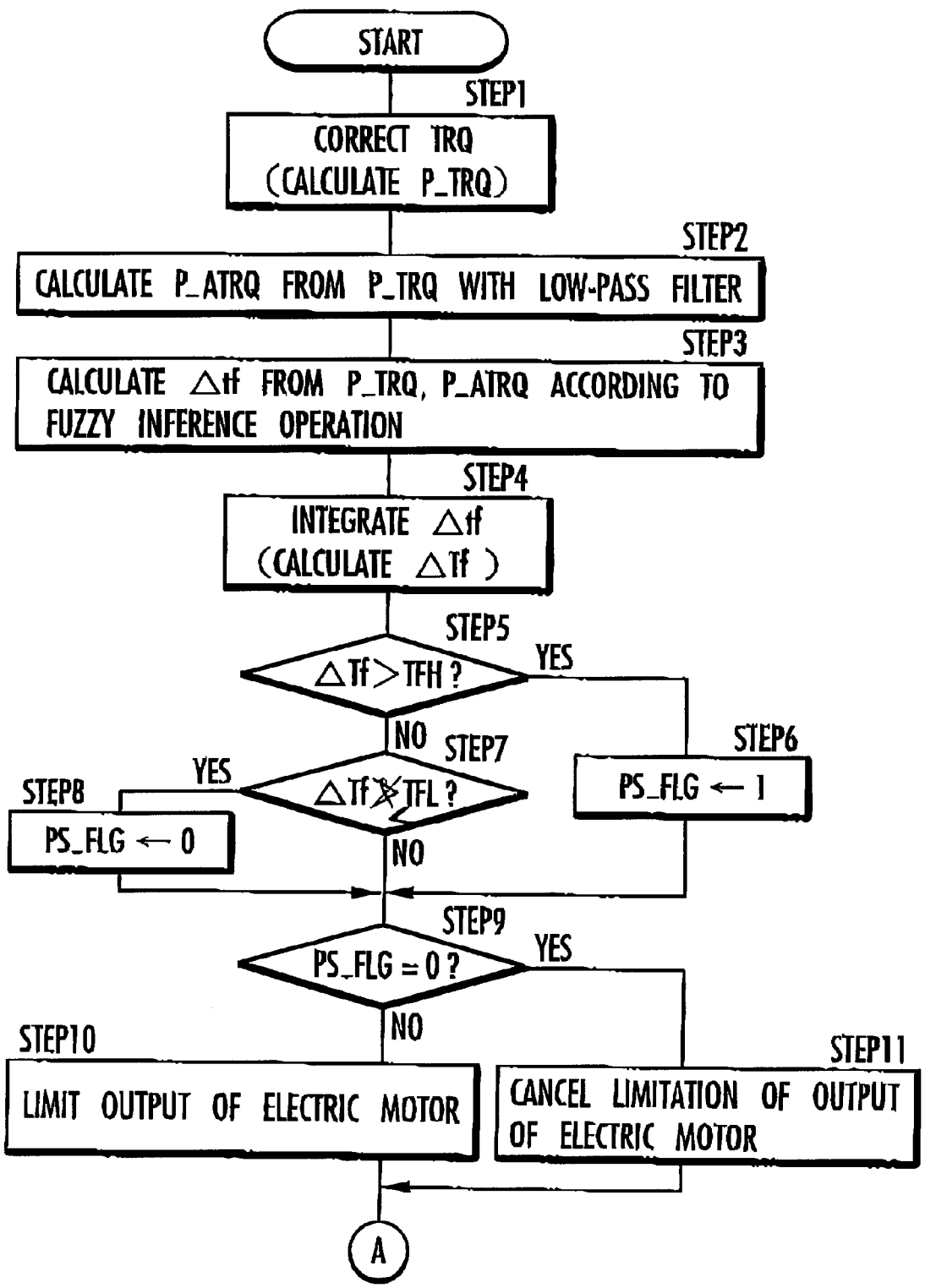
FIGS. 9 and 10 are a flowchart of a sequence of the processing operation of the motor controller shown in FIG. 2.
Figure 10:
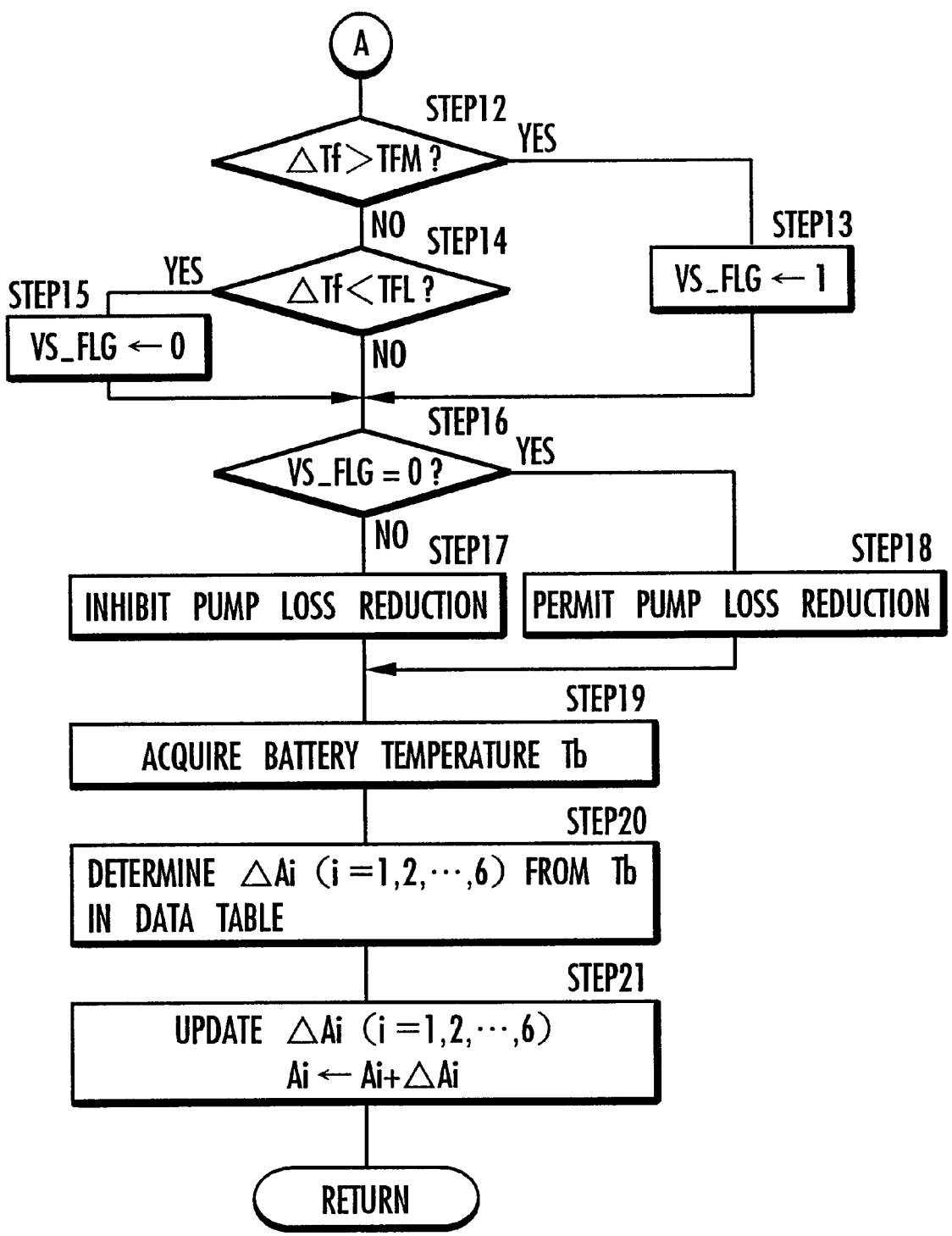
Figure 11:
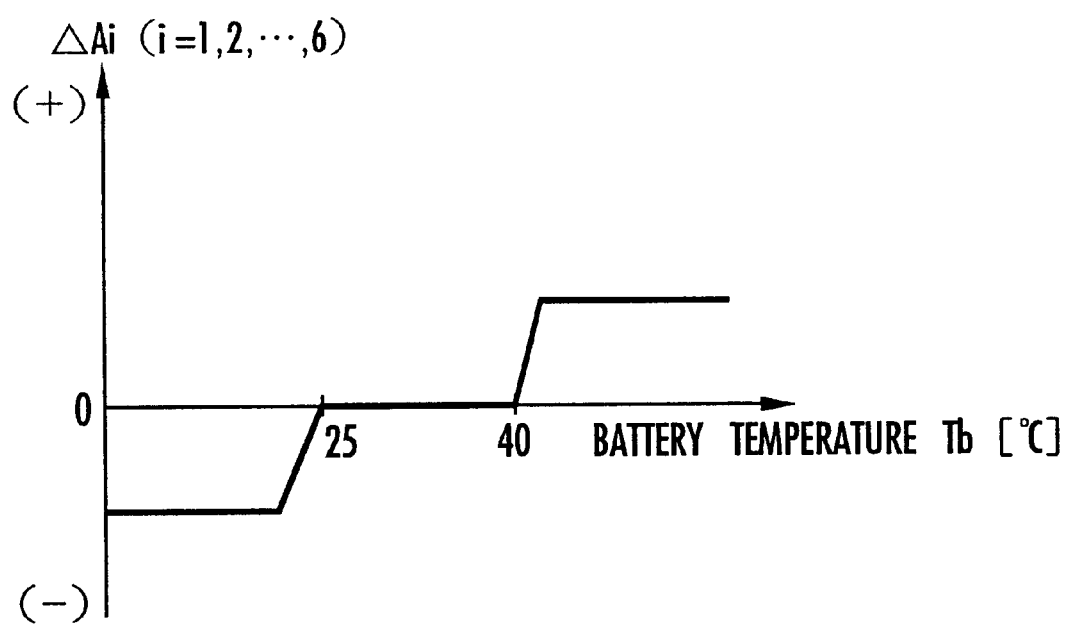
FIG. 11 is a diagram showing data tables used in the processing operation of the motor controller shown in FIG. 2.

Concurrent with the above process of controlling the electric motor 2, the fuzzy inference means 36, etc. of the motor ECU 26 performs a sequence of processing operation shown in FIGS. 9 and 10 in predetermined cycle times.

In STEP 1, the torque command correcting means 34 corrects the torque command value TRQ generated by the torque command value generating means 32 depending on the battery voltage Vb and the rotational speed NM of the electric motor 2, calculating a corrected torque command value P_TRQ which is substantially proportional to the armature current of the electric motor 2.

In STEP 2, the low-pass filter 35 effects low-pass filtering to calculate an average corrected torque command value P_ATRQ which represents an average of corrected torque command values P_TRQ.

In STEP 3, the fuzzy inference means 36 calculates an inferred temperature change Δtf from the average corrected torque command value P_ATRQ and the corrected torque command value P_TRQ. In STEP 4, the integrating means 37 integrates (accumulatively adds) the inferred temperature change Δtf to determine an accumulated temperature change ΔTf.

The output limiting means 38 then carries out STEP 5 through STEP 11.

Specifically, in STEP 5, the output limiting means 38 compares the accumulated temperature change ΔTf with a predetermined output limiting threshold TFH (see FIGS. 7 and 8). The output limiting threshold TFH is a positive threshold for determining whether the electric motor 2 is overheated or not. If a temperature increase from the steady temperature of the electric motor 2 exceeds the output limiting threshold TFH, then the actual temperature of the electric motor 2 is excessively high.

If ΔTf>TFH, then the output limiting means 38 sets the value of a flag PS_FLG to "1" in STEP 6. If the output of the electric motor 2 is to be limited, then the value of the flag PS_FLG is set to "1", and if the output of the electric motor 2 is not to be limited, then the value of the flag PS_FLG is set to "0". The initial value of the flag PS_FLG is "0". Thereafter, control goes to STEP 9.

If ΔTf≦TFH, then the output limiting means 38 compares the accumulated temperature change ΔTf with a predetermined output limitation canceling threshold TFL (see FIGS. 7 and 8) in STEP 7. The output limitation canceling threshold TFL is a positive threshold for determining whether the limitation of the output of the electric motor 2 is to be canceled or not. The output limitation canceling threshold TFL is smaller than the output limiting threshold TFH.

If ΔTf<TFL, then the output limiting means 38 sets the value of the flag PS_FLG to "1" in STEP 8. Then, control goes to STEP 9. If ΔTf≧TFL, then the output limiting means 38 does not change the value of the flag PS_FLG, and control goes to STEP 9.

In STEP 9, the output limiting means 38 determines the value of the flag PS_FLG. If PS_FLG=1, then the output limiting means 38 performs a process of limiting the output of the electric motor 2. In this limiting process, the output limiting means 38 instructs the torque command value generating means 32 to limit the magnitude (absolute value) of the torque command value TRQ to be generated thereby.

At this time, the torque command value generating means 32 limits the magnitude |TRQ| of the torque command value TRQ to a predetermined upper limit value PSTRQ (see FIGS. 7 and 8) or below. If the output torque (regenerative torque in the illustrated example, hereinafter referred to as "required torque") of the electric motor 2 which is required depending on the accelerator operation quantity θAP and the vehicle speed Vcar or the remaining capacity of the battery 23 is of an illustrated magnitude, then the magnitude (absolute value) of the torque command value TRQ is forcibly limited to the upper limit value PSTRQ. In a situation where |required torque|≦PSTRQ, the required torque becomes the torque command value TRQ.

The upper limit value PSTRQ of the torque command value TRQ is determined such that when the electric motor 2 is controlled using the upper limit value PSTRQ as the torque command value TRQ while the electric motor 2 is at the steady temperature, the actual temperature of the electric motor 2 decreases. Specifically, the upper limit value PSTRQ is determined such that the corrected torque command value P_TRQ corresponding thereto (the value produced when the upper limit value PSTRQ is corrected by the torque command correcting means 34) is a value equal to or smaller than the given value LPTRQ in FIG. 5, e.g., slightly smaller than the given value LPTRQ.

If PS_FLG=0 in STEP 9, then the output limiting means 38 performs a process of canceling the limitation of the output of the electric motor 2. In this canceling process, the output limiting means 38 instructs the torque command value generating means 32 not to limit the output of the electric motor 2. At this time, the torque command value generating means 32 generates the required torque as the torque command value TRQ as usual.

If the accumulated temperature change ΔTf increases to exceed the output limiting threshold TFH in STEP 5 through STEP 11, then as shown in FIGS. 7 and 8, the output torque of the electric motor 2 is limited to the upper limit value PSTRQ. Since the upper limit value PSTRQ is established as described above, the temperature of the electric motor 2 drops, and the accumulated temperature change ΔTf also drops. If the accumulated temperature change ΔTf becomes lower than the output limitation canceling threshold TFL smaller than the output limiting threshold TFH, then the limitation of the output of the electric motor 2 is canceled, and the output torque of the electric motor 2 returns to the required torque depending on the accelerator operation quantity θAP and the vehicle speed Vcar or the remaining capacity of the battery 23. Since TFH>TFL, the process of limiting the output of the electric motor 2 and the process of canceling the limitation of the output of the electric motor 2 have hysteresis characteristics. Therefore, even if the required torque fluctuates, the process of limiting the output of the electric motor 2 and the process of canceling the limitation of the output of the electric motor 2 are prevented from being frequently repeated in short periodic cycles.

Then, the motor ECU 26 performs a processing operation of the loss reduction inhibiting means 39 in STEP 12 through STEP 18 shown in FIG. 10.

In STEP 12, the loss reduction inhibiting means 39 compares the present accumulated temperature change ΔTf with a predetermined loss reduction inhibiting threshold TFM (see FIGS. 7 and 8). The loss reduction inhibiting threshold TFM is of a value slightly smaller than the output limiting threshold TFH. If ΔTf>TFM, then the loss reduction inhibiting means 39 sets the value of a flag VS_FLG to "1" in STEP 13, and then control goes to STEP 16. If the process of reducing a pumping loss of the engine 1 carried out by the engine ECU 20 is to be inhibited, then the value of the flag VS_FLG is set to "1", and if the process of reducing a pumping loss of the engine 1 carried out by the engine ECU 20 is not to be inhibited, then the value of the flag VS_FLG is set to "0".

If ΔTf≦TFM, then the loss reduction inhibiting means 39 compares the accumulated temperature change ΔTf with the output limiting threshold TFL as a loss reduction permitting threshold in STEP 14. In STEP 14, the accumulated temperature change ΔTf may be compared with a threshold slightly smaller than the output limiting threshold TFL.

If ΔTf<TFL, then the loss reduction inhibiting means 39 sets the value of the flag VS_FLG is set to "0" in STEP 15, after which control goes to STEP 16. If ΔTf≧TFL, then the value of the flag VS_FLG remains unchanged, and control proceeds to STEP 16.

In STEP 16, the loss reduction inhibiting means 39 determines the value of the flag VS_FLG. If VS FLG=1, then the loss reduction inhibiting means 39 performs a process of inhibiting a reduction of the pumping loss of the engine 1 in STEP 17. In this process, the loss reduction inhibiting means 39 instructs the engine ECU 20 to inhibit a reduction of the pumping loss. At this time, the engine ECU 20 does not reduce the pumping loss of the engine 1 when the electric motor 2 operates in the regenerative mode.

If VS_FLG=0 in STEP 16, then the loss reduction inhibiting means 39 performs a process of permitting a reduction of the pumping loss of the engine 1 in STEP 18. In this process, the loss reduction inhibiting means 39 instructs the engine ECU 20 to reduce the pumping loss of the engine 1. At this time, when the electric motor 2 operates in the regenerative mode, the engine EPU 20 stops the supply of the fuel to the engine 1, and controls the intake valve actuator 5 and the exhaust valve actuator 9 to close the intake valves 6 and the exhaust valves 9 or opens the EGR valve on the exhaust gas recirculation path 15 to reduce the pumping loss of the engine 1.

In STEP 12 through STEP 18, when the electric motor 2 operates in the regenerative mode, the process of reducing the pumping loss of the engine 1 while the regenerative torque is being limited is inhibited. Therefore, so-called engine braking is applied to compensate for a reduction in the braking power of the vehicle due to the limitation of the regenerative torque of the electric motor 2, allowing the vehicle to have an appropriate level of decelerating braking power. Inasmuch as the loss reduction inhibiting threshold TFM is smaller than the output limiting threshold TFH, the process of reducing the pumping loss of the engine 1 is inhibited, applying engine braking, before the regenerative torque of the electric motor 2 is abruptly reduced by the limitation of the output thereof. Consequently, Continuous decelerating braking power is available without a temporary abrupt reduction thereof. When the temperature of the electric motor 2 is lowered to cause the accumulated temperature change ΔTf to be lower than the output limitation canceling threshold TFL, canceling the limitation of the output of the electric motor 2, since the perform of reducing the pumping loss of the engine 1 is carried out again, the electric motor 2 can regenerate electric power at a relatively large regenerative torque with high energy efficiency. Because TFM>TFL, the processes of inhibiting and permitting a reduction of the pumping loss of the engine 1 have hysteresis characteristics. Therefore, even if the required torque in the regenerative mode of the electric motor 2 fluctuates, the processes of inhibiting and permitting a reduction of the pumping loss of the engine 1 are prevented from being frequently repeated in short periodic cycles.

Then, the motor ECU 26 performs a processing operation of the consequent part correcting means 40 in STEP 19 through STEP 21 shown in FIG. 10. Thereafter, the processing in one cycle time is finished.

In STEP 19, the consequent part correcting means 40 acquires data of the present battery temperature Tb from the battery ECU 30. In STEP 20, the consequent part correcting means 40 determines corrective quantities ΔA1 through ΔA6 for the set temperature changes A1 through A6 in the consequent part of the fuzzy rules from the battery table Tb in data tables shown in FIG. 11, for example. The corrective quantities ΔA1 through ΔA6 are added to the respective set temperature changes A1 through A6, thereby correcting the set temperature changes A1 through A6.

In the present embodiment, the data tables are provided with respect to the respective set temperature changes A1 through A6. The tendencies of changes in the corrective quantities ΔA1 through ΔA6 with respect to the battery temperature Tb are the same for all the data tables. Specifically, the corrective quantities ΔA1 through ΔA6 in each of the data tables are "0" when the battery temperature Tb is in a normal temperature range from 25° C. to 40° C., for example. When the battery temperature Tb is in a higher temperature range than the normal temperature range, the corrective quantities ΔA1 through ΔA6 in each of the data tables are of a positive value which is substantially constant, and when the battery temperature Tb is in a lower temperature range than the normal temperature range, the corrective quantities ΔA1 through ΔA6 in each of the data tables are of a negative value which is substantially constant. Basically, as the battery temperature Tb is higher, the corrective quantities ΔA1 through ΔA6 are of a greater positive value, and as the battery temperature Tb is lower, the corrective quantities ΔA1 through ΔA6 are of a greater negative value. The values of the corrective quantities ΔA1 through ΔA6 in the higher temperature range of the battery temperature Tb may not necessarily be the same, and the values of the corrective quantities ΔA1 through ΔA6 in the lower temperature range of the battery temperature Tb may not necessarily be the same.

In STEP 21, the consequent part correcting means 40 adds the corrective quantities ΔA1 through ΔA6 determined by the above data tables to the respective set temperature changes A1 through A6, thereby correcting the set temperature changes A1 through A6.

The set temperature changes A1 through A6 thus corrected will be used in the processing operation of the fuzzy inference means 36 in a next cycle time.

By thus correcting the set temperature changes A1 through A6 in the consequent part of the fuzzy rules depending on the battery temperature Tb, the inferred temperature change Δtf sequentially calculated by the fuzzy inference means 36 is smaller when the battery temperature Tb is in the lower temperature range than when the battery temperature Tb is in the normal temperature range. Therefore, the rate of the increase in the accumulated temperature change ΔTf at the time when the electric motor 2 generates a large torque (a torque in the power mode or the regenerative mode) in excess of the rated torque is smaller than when the battery temperature Tb is in the normal temperature range. As a result, the time required until the accumulated temperature change ΔTf exceeds the output limiting threshold is extended, resulting in an increase in the period in which a relatively large current flows through the armature of the electric motor 2 and hence the battery 23. The battery temperature Tb can thus be increased quickly to a temperature at which the battery 23 exhibits its intended performance.

If the temperature of the battery 23 is relatively low, then since the temperature of the electric motor 2 is also relatively low, the time required until the accumulated temperature change ΔTf exceeds the output limiting threshold is increased. Therefore, even if the process of limiting the output of the electric motor 2 is delayed, the delay does not pose a problem in preventing the electric motor 2 from being overheated.

Conversely, when the battery temperature Tb is in the higher temperature range, the inferred temperature change Δtf sequentially calculated by the fuzzy inference means 36 is greater than when the battery temperature Tb is in the normal temperature range. Therefore, the rate of the increase in the accumulated temperature change ΔTf at the time when the electric motor 2 generates a large torque (a torque in the power mode or the regenerative mode) in excess of the rated torque is greater than when the battery temperature Tb is in the normal temperature range. As a result, the time required until the accumulated temperature change ΔTf exceeds the output limiting threshold is reduced, resulting in an decrease in the period in which a relatively large current flows through the armature of the electric motor 2 and hence the battery 23. Consequently, the battery 23 is prevented from suffering an excessive load when the temperature of the battery 23 is relatively high.

As described above, the apparatus according to the present invention is capable of allowing the hybrid vehicle to exhibit its good running performance while preventing the electric motor 2 from being overheated at excessively high temperatures without the need for sensors for detecting the temperature of the electric motor 2.

The accumulated temperature change ΔTf may start being calculated from the start of operation of the hybrid vehicle. For preventing the electric motor 2 from being overheated, a temperature increase from the steady temperature of the electric motor 2 poses a problem. In a situation where the temperature of the electric motor 2 at the start of operation of the hybrid vehicle is relatively low, as when the engine temperature TW of the engine 1 at the start of operation of the hybrid vehicle is relatively low, the accumulated temperature change ΔTf may start being calculated after the hybrid vehicle is driven for a certain period of time and the temperature of the electric motor 2 is assumed to be saturated at the steady temperature.

Figure 12:
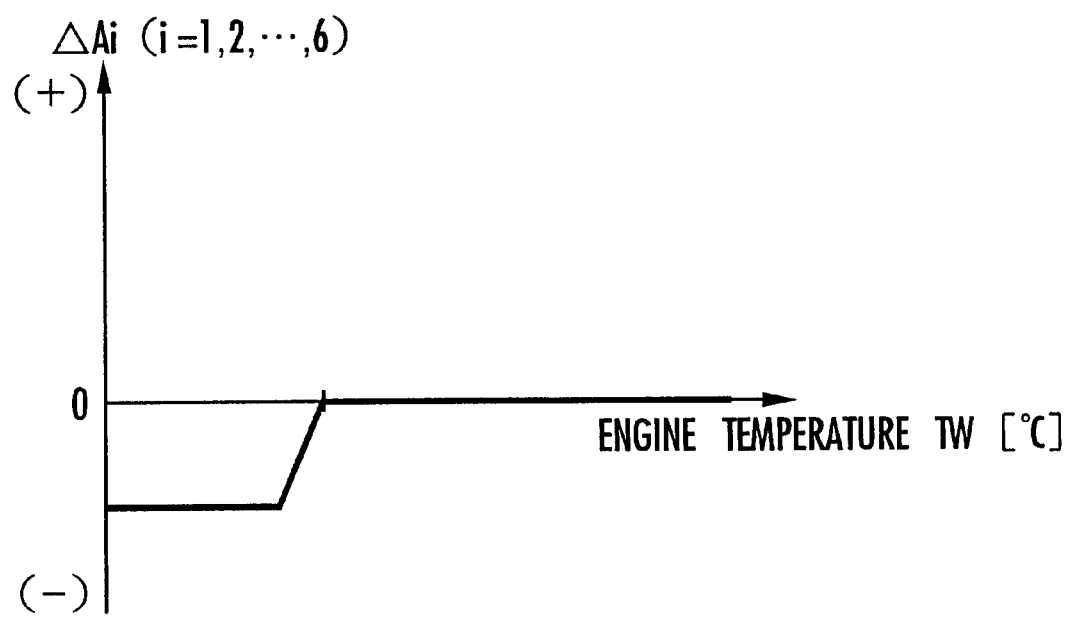
FIG. 12 is a diagram showing data tables used in the processing operation of a motor controller according to a second embodiment of the present invention.

A second embodiment of the present invention will be described below with reference to FIG. 12. The second embodiment differs from the first embodiment only as a portion of the processing operation of the motor ECU 26. Those parts of the second embodiment which are identical to those of the first embodiment are denoted by identical reference characters, and identical structural and functional details will not be described below.

According to the second embodiment, only the processing operation of the consequent part correcting means 40 of the motor ECU 26 differs from that of the first embodiment. Specifically, the consequent part correcting means 40 according to the second embodiment corrects the set temperature changes A1 through A6 in the consequent part of the fuzzy rules depending on the engine temperature TW of the engine 1, rather than the battery temperature Tb. The consequent part correcting means 40 has data tables shown in FIG. 12 for determining corrective quantities ΔA1 through ΔA6 for the set temperature changes A1 through A6 depending on the engine temperature TW.

As with the previous embodiment, the data tables are provided with respect to the respective set temperature changes A1 through A6. The tendencies of changes in the corrective quantities ΔA1 through ΔA6 with respect to the engine temperature TW of the engine 1 are the same for all the data tables. Specifically, the corrective quantities ΔA1 through ΔA6 in each of the data tables are "0" when the engine temperature TW of the engine 1 is in a normal temperature range higher than 90° C., for example. When the engine temperature TW is in a lower temperature range than the normal temperature range, the corrective quantities ΔA1 through ΔA6 in each of the data tables are of a negative value which is substantially constant.

In each cycle time for calculating the accumulated temperature change ΔTf, the processing in STEP 19 through STEP 21 shown in FIG. 10 is not carried out, but the corrective quantities ΔA1 through ΔA6 for the set temperature changes A1 through A6 are determined from the present engine temperature TW of the engine 1 using the above data tables, and the determined corrective quantities ΔA1 through ΔA6 are added to the respective present values of the set temperature changes A1 through A6, thus correcting the set temperature changes A1 through A6. Other processing details than described above are identical to those of the previous embodiment.

In the second embodiment, the set temperature changes A1 through A6 in the consequent part of the fuzzy rules are corrected depending on the engine temperature TW of the engine 1. In a situation where the engine temperature TW of the engine 1 is in the lower temperature range and the temperature of the electric motor 2 is determined as being low, the inferred temperature change Δtf sequentially calculated by the fuzzy inference means 36 is smaller than when the engine temperature TW is in the normal temperature range. Therefore, the rate of the increase in the accumulated temperature change ΔTf at the time when the electric motor 2 generates a large torque in excess of the rated torque is smaller than when the engine temperature TW is in the normal temperature range. As a result, the time required until the accumulated temperature change ΔTf exceeds the output limiting threshold is extended, resulting in an increase in the period in which a desired torque can be produced by the electric motor 2 and allowing the hybrid vehicle to exhibit its good running performance.

In the present embodiment, the set temperature changes A1 through A6 in the consequent part of the fuzzy rules are not corrected depending on the battery temperature Tb. However, the set temperature changes A1 through A6 may be corrected depending on both the engine temperature TW and the battery temperature Tb. In this modification, corrective quantities ΔA1 through ΔA6 may be determined from the engine temperature TW and the battery temperature Tb using maps of the like.

The first and second embodiments have been described above with respect to the hybrid vehicle. However, the apparatus for controlling the electric motor according to the present invention is not limited to the hybrid vehicle, but may be applied to electric vehicles having no engines. The principles of the present invention are also applicable to apparatus for controlling electric motors other than electric motors installed on vehicles.

In the first and second embodiments, the fuzzy inference operation is carried out using the corrected torque command value P_TRQ which is produced by correcting the torque command value TRQ, in order to perform the field weakening control process in the d-q vector control process. If the field weakening control process for the electric motor is not carried out, then the fuzzy inference operation may be performed directly using the torque command value TRQ.

In the first and second embodiments, the inferred temperature change Δtf is determined by the fuzzy inference operation. However, the inferred temperature change Δtf may be determined using another model which appropriately represents a correlation between the torque command value TRQ (or the corrected torque command value P_TRQ) or its average value and temperature changes of the electric motor 2.

Although certain preferred embodiments of the present invention have been shown and described in detail, it should be understood that various changes and modifications may be made therein without departing from the scope of the appended claims.

What is claimed is:

1. An apparatus for controlling an electric motor depending on a torque command value, comprising:

inference means for sequentially calculating an inferred value of a temperature change of the electric motor in each cycle time using at least data representing the torque command value and data representing an average of torque command values;

integrating means for sequentially integrating the inferred value of the temperature change of the electric motor to calculate an accumulated temperature change; and output limiting means for limiting the output of the electric motor when said accumulated temperature change exceeds a predetermined output limiting threshold.

2. An apparatus according to claim 1, wherein said inference means comprises fuzzy inference means for sequentially calculating an inferred value of a temperature change of the electric motor according to a fuzzy inference operation using at least the data representing the torque command value and the data representing an average of torque command values as input parameters.

3. An apparatus according to claim 2, wherein membership functions and fuzzy rules used in the fuzzy inference operation are established such that the inferred value of the temperature change is substantially zero when said torque command value is present in a predetermined range.

4. An apparatus according to claim 2 or 3, wherein said fuzzy inference means comprises means for using a first membership function for classifying and expressing the degree of the magnitude of the torque command value, a second membership function for classifying and expressing the degree of the magnitude of the average of torque command values, and a plurality of fuzzy rules having said input parameters in an antecedent part thereof and a plurality of preset values for the temperature change in a consequent part thereof, determining the fitnesses of said input parameters with respect to the antecedent part of the fuzzy rules based on said first and second membership functions, and determining the center of gravity of the temperature change in said consequent part as the inferred value of the temperature change using the determined fitnesses as weighting coefficients.

5. An apparatus according to claim 4, wherein said first membership function is established to represent a model of the amount of heat generated by said electric motor with respect to said torque command value, and said second membership function is established to represent a model of the tendency of the temperature change of said electric motor with respect to the average of torque command values.

6. An apparatus according to claim 4, further comprising:

an electric energy storage device as a power supply for said electric motor; and consequent part correcting means for correcting at least one of the preset values for the temperature change in the consequent part of said fuzzy rules depending on the temperature of said electric energy storage device.

7. An apparatus according to claim 6, wherein said consequent part correcting means comprises means for correcting at least one of the preset values for the temperature change in order to reduce the inferred value of said temperature change as the temperature of said electric energy storage device is lower, and to increase the inferred value of said temperature change as the temperature of said electric energy storage device is higher.

8. An apparatus according to claim 1, wherein said output limiting means comprises means for limiting the output torque of said electric motor to a torque which is equal to or lower than a predetermined torque which is preset to lower the temperature of said electric motor.

9. An apparatus according to claim 1, wherein said output limiting means comprises means for canceling the limitation of the output of said electric motor when said accumulated temperature change exceeds said output limiting threshold and thereafter becomes lower than a predetermined limitation canceling threshold which is smaller than said output limiting threshold.

10. An apparatus according to claim 2, further comprising:
    means for performing a d-q vector control process of said electric motor, as means for controlling said electric motor depending on the torque command value; and
    torque command correcting means for correcting said torque command value depending on at least a rotational speed of said electric motor;
    said fuzzy inference means being supplied with a corrected value of the torque command value produced by said torque command correcting means and an average of corrected values produced by said torque command correcting means, as said input parameters, rather than said torque command value and said average of torque command values.

11. An apparatus according to claim 10, wherein said torque command correcting means comprises means for correcting said torque command value so as to be increased as the rotational speed of said electric motor is higher.

12. An apparatus for controlling a hybrid vehicle having an engine for generating a propulsive force for the hybrid vehicle, an electric motor coupled to an output shaft of said engine for selectively generating an assistive propulsive force for the hybrid vehicle in a power mode and generating electric energy using the kinetic energy of the hybrid vehicle as an energy source in a regenerative mode, depending on the operating state of the hybrid vehicle, and an electric energy storage device as a power supply for the electric motor in said power mode, wherein a torque command value for the electric motor is generated depending on the operating state of the hybrid vehicle, and the electric motor is controlled depending on the torque command value, said apparatus comprising:
    inference means for sequentially calculating an inferred value of a temperature change of the electric motor in each cycle time using at least data representing the torque command value and data representing an average of torque command values;
    integrating means for sequentially integrating the inferred value of the temperature change of the electric motor from a predetermine time to calculate an accumulated temperature change from the predetermine time; and
    output limiting means for limiting the output of the electric motor when said accumulated temperature change exceeds a predetermined output limiting threshold.

13. An apparatus according to claim 12, wherein membership functions and fuzzy rules used in the fuzzy inference operation are established such that the inferred value of the temperature change is substantially zero when said torque command value is present in a predetermined range.

14. An apparatus according to claim 13, wherein said fuzzy inference means comprises means for using a first membership function for classifying and expressing the degree of the magnitude of the torque command value, a second membership function for classifying and expressing the degree of the magnitude of the average of torque command values, and a plurality of fuzzy rules having said input parameters in an antecedent part thereof and a plurality of preset values for the temperature change in a consequent part thereof, determining the fitnesses of said input parameters with respect to the antecedent part of the fuzzy rules based on said first and second membership functions, and determining the center of gravity of the temperature change in said consequent part as the inferred value of the temperature change using the determined fitnesses as weighting coefficients, said apparatus further comprising:
    consequent part correcting means for correcting at least one of the preset values for the temperature change in the consequent part of said fuzzy rules depending on the engine temperature of said engine.

15. An apparatus according to claim 14, wherein said consequent part correcting means comprises means for correcting at least one of the preset values for the temperature change in order to reduce the inferred value of said temperature change by a smaller value when at least the engine temperature of said engine is lower than a predetermined temperature than when the engine temperature is higher than said predetermined temperature.

16. An apparatus according to any one of claims 12 through 15, further comprising:
    engine loss reduction control means for performing a process of reducing a pumping loss of said engine when said electric motor operates in said regenerative mode; and
    engine loss reduction inhibiting means for inhibiting the process of reducing a pumping loss of said engine from being performed by said engine loss reduction control means when said accumulated temperature change exceeds a predetermined engine loss reduction inhibiting threshold which is lower than said output limiting threshold.

17. An apparatus according to 16, wherein said engine loss reduction inhibiting means comprises means for permitting the process of reducing a pumping loss of said engine to be performed by said engine loss reduction control means when said accumulated temperature change exceeds said engine loss reduction inhibiting threshold and thereafter becomes lower than a predetermined engine loss reduction permitting threshold which is lower than said engine loss reduction inhibiting threshold.

* * * * *